US010023406B2

(12) United States Patent
Klubertanz et al.

(10) Patent No.: US 10,023,406 B2
(45) Date of Patent: Jul. 17, 2018

(54) CYCLOIDAL WHEEL DRIVE

(71) Applicant: Actuant Corporation, Menomonee Falls, WI (US)

(72) Inventors: James A. Klubertanz, Colgate, WI (US); Wallace Buege, West Bend, WI (US); Bradley Ballweg, West Bend, WI (US); Dennis Zolp, Kewaskum, WI (US)

(73) Assignee: Actuant Corporation, Menomonee Falls, WI (US)

( * ) Notice: Subject to any disclaimer, the term of this patent is extended or adjusted under 35 U.S.C. 154(b) by 0 days.

(21) Appl. No.: 14/911,699

(22) PCT Filed: Aug. 13, 2014

(86) PCT No.: PCT/US2014/050899
§ 371 (c)(1),
(2) Date: Feb. 11, 2016

(87) PCT Pub. No.: WO2015/023754
PCT Pub. Date: Feb. 19, 2015

(65) Prior Publication Data
US 2016/0200528 A1 Jul. 14, 2016

Related U.S. Application Data

(60) Provisional application No. 61/865,280, filed on Aug. 13, 2013.

(51) Int. Cl.
*B65G 65/46* (2006.01)
*B65G 33/34* (2006.01)
*F16H 1/32* (2006.01)

(52) U.S. Cl.
CPC ........... *B65G 65/466* (2013.01); *B65G 33/34* (2013.01); *F16H 1/321* (2013.01); *F16H 2001/323* (2013.01); *F16H 2200/2005* (2013.01)

(58) Field of Classification Search
CPC .............. B65G 65/4836; B65G 65/466; A01F 25/2018
See application file for complete search history.

(56) References Cited

U.S. PATENT DOCUMENTS 3,749,259 A * 7/1973 Stock .................. B65G 65/466
301/44.3
4,245,516 A 1/1981 Day
(Continued)

FOREIGN PATENT DOCUMENTS

DE 8810135 1/1989
JP 2006258289 * 9/2006 .............. B60L 15/00
(Continued)

OTHER PUBLICATIONS

Machine translation of JP2006258289 from espacenet, Generated on Apr. 26, 2017 at http://translationportal.epo.org/emtp/translate/?ACTION=description-retrieval&COUNTRY=JP&ENGINE=google&FORMAT=docdb&KIND=A&LOCALE=en_EP&NUMBER=2006258289&OPS=ops.epo.org/3.2&SRCLANG=ja&TRGLANG=en.*
(Continued)

*Primary Examiner* — Mark C Hageman
(74) *Attorney, Agent, or Firm* — Michael Best & Friedrich LLP

(57) ABSTRACT

A wheel assembly and a bin sweep system. The system may include a sweep auger for moving granules, and a wheel assembly including a rim and a tire disposed on the rim, the rim defining an interior radially inward of an inner circumference of the rim, and a cycloidal drive disposed in the (Continued)

interior of the rim. The cycloidal drive may include an input shaft, a drive gear having first gearing features and being eccentrically mounted on the input shaft, a stationary drive plate, and second gearing features coupled to the rim, the first gearing features engaging the second gearing features to drive the rim and wheel at a reduced speed relative to the input shaft.

20 Claims, 10 Drawing Sheets

(56) References Cited

U.S. PATENT DOCUMENTS

| | | |
|---|---|---|
| 4,390,161 A | 6/1983 | Nelson |
| 4,426,064 A | 1/1984 | Healy |
| 4,701,093 A * | 10/1987 | Meyer ............... B65G 65/466 414/312 |
| 5,482,508 A | 1/1996 | Redekop et al. |
| 6,238,286 B1 | 5/2001 | Aubry et al. |
| 6,251,009 B1 | 6/2001 | Grywacheski et al. |
| 6,254,329 B1 | 7/2001 | Sukup et al. |
| 6,561,304 B1 | 5/2003 | Henry |
| 7,025,555 B2 * | 4/2006 | Hanig ............... B65G 65/466 366/261 |
| 8,210,342 B2 * | 7/2012 | Lepp ............... B65G 65/466 198/801 |
| 8,506,438 B2 * | 8/2013 | Makino ............... B60K 1/00 475/159 |
| 2010/0300782 A1 | 12/2010 | Walter et al. |
| 2011/0291462 A1 | 12/2011 | Meyers |
| 2012/0241233 A1 | 9/2012 | Suzuki |
| 2013/0099554 A1 | 4/2013 | Lee |

FOREIGN PATENT DOCUMENTS

| | | |
|---|---|---|
| WO | 2012066035 | 5/2012 |
| WO | 2012168413 | 12/2012 |

OTHER PUBLICATIONS

International Search Report and Written Opinion for Application No. PCT/US2014/050899 dated Dec. 3, 2014 (7 pages).
"Gears and Gear Drives," Motion System Design, 2001, pp. A145-A160.
Zalewski, Michal, "Cycloidal transmission," 2002, Retrieved from the Internet on Apr. 3, 2013 <URL: http://lcamtuf.coredump.cx/cycloid/>.
EP14835766 Extended European Search Report and Written Opinion dated Mar. 15, 2017 (12 pages).

* cited by examiner

CYCLOIDAL WHEEL DRIVE

RELATED APPLICATIONS

This application claims priority to U.S. Provisional Patent Application Ser. No. 61/865,280 filed on Aug. 13, 2013, the entire contents of which are incorporated herein by reference.

FIELD

The present invention relates to a wheel and drive assembly for wheel-driven applications, such as granule conveyors used to move granules, such as grains.

SUMMARY

Typical wheel and drive assemblies for granule conveyors, e.g., bin sweep systems, include a wheel and a gearbox separate from the wheel and drivingly coupled to the wheel. A motor drives the gearbox, which in turn drives the wheel. The gearbox provides speed reduction to the wheel. The wheel defines an axis of rotation and corresponding axial direction, and the gearbox is disposed to a side of the wheel in the axial direction. Therefore, typical wheel drives are wide in the axial direction.

Typical wheel drives also use a parallel shaft drive system having spur/helical gears, chains and sprockets. Such systems are not sealed, are relatively inefficient, and have relatively lower power capacity.

In one aspect, the invention provides a cycloidal gear assembly having an input shaft for receiving a rotational input, the input shaft defining a longitudinal axis, and a driven ring gear configured for rotational output converted from the rotational input, the ring gear having a generally annular portion. The assembly also includes an intermediate gear structure for converting the rotational input from the input shaft to the rotational output of the ring gear, the intermediate gear structure including a movable drive gear configured for cycloidal movement within the ring gear.

In another aspect, the invention provides a wheel having a tire for movement across a surface, the tire having a generally annular portion, the annular portion defining a receptacle. The wheel also includes a drive assembly configured to receive an input from an input shaft, the drive assembly being disposed substantially within the receptacle and configured to drive the tire at a reduced speed with respect to the input shaft.

In yet another aspect, the invention provides a cycloidal gear assembly including a ring gear having a generally annular shape and defining a central axis coaxial with the ring gear. A movable drive gear having gearing features is configured for cycloidal movement within the ring gear. The drive gear has pins extending therefrom in a direction generally parallel with the central axis. The assembly also includes a stationary drive plate having apertures, the apertures receiving the pins.

In yet another aspect, the invention provides a wheel including a tire for movement across a surface, the tire having a generally annular portion, the annular portion defining a receptacle. The wheel also includes a drive assembly configured to drive the tire, and a lubricant for lubricating the drive assembly, the lubricant being disposed substantially within the receptacle.

In yet another aspect, the invention provides a cycloidal gear system having an input shaft driven in a rotational direction, and a cycloidal gear assembly driven by the input shaft and configured to convert a first speed of the input shaft into a second speed of an output, the second speed being less than the first speed. The cycloidal gear assembly is configured to preserve the direction of the input shaft to the output.

In yet another aspect, the invention provides a bin sweep system having a sweep auger for moving granules, and a wheel assembly. The wheel assembly includes an input shaft driven by the sweep auger, a wheel rim, and a cycloidal drive driven by the input shaft to drive the wheel rim at a reduced speed.

Other independent aspects of the invention will become apparent by consideration of the detailed description and accompanying drawings.

DETAILED DESCRIPTION

Before any independent constructions of the invention are explained in detail, it is to be understood that the invention is not limited in its application to the details of construction and the arrangement of components set forth in the following description or illustrated in the following drawings. The invention is capable of other independent constructions and of being practiced or of being carried out in various ways.

Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. In addition, it is to be understood that such terms as "forward", "rearward", "left", "right", "upward" and "downward", etc., are words of convenience and are not to be construed as limiting terms. The terms "mounted," "connected" and "coupled" are used broadly and encompass both direct and indirect mounting, connecting and coupling.

Figure 1A:
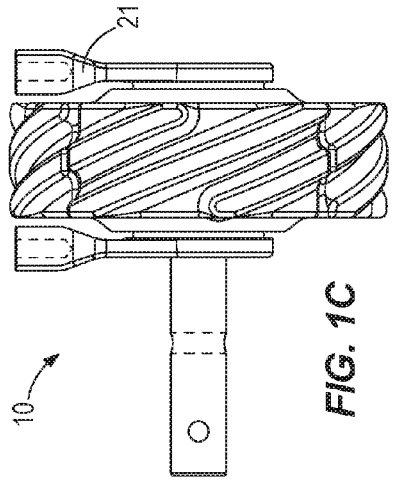
FIGS. 1A-1D illustrate a wheel assembly.
Figure 1C:
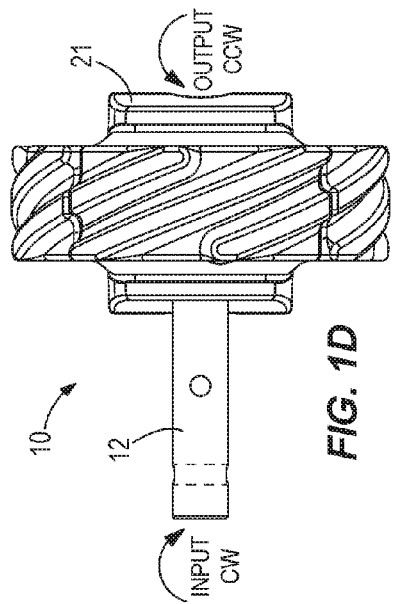
Figure 1B:
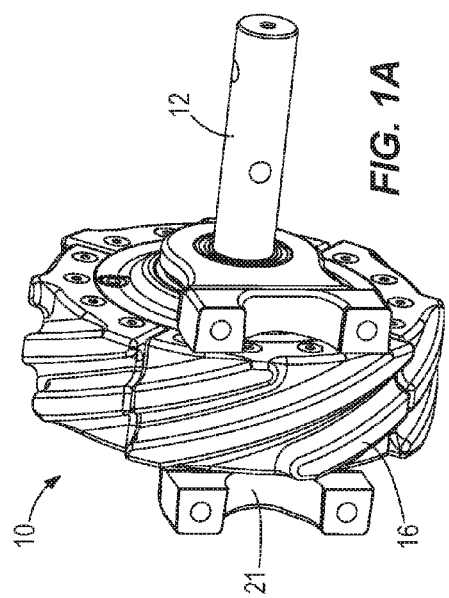
Figure 1D:
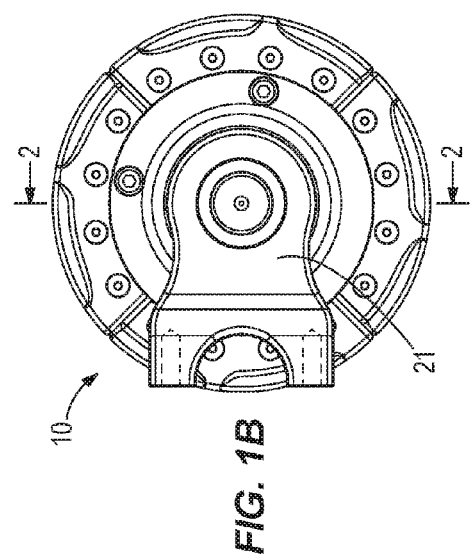
Figure 2:
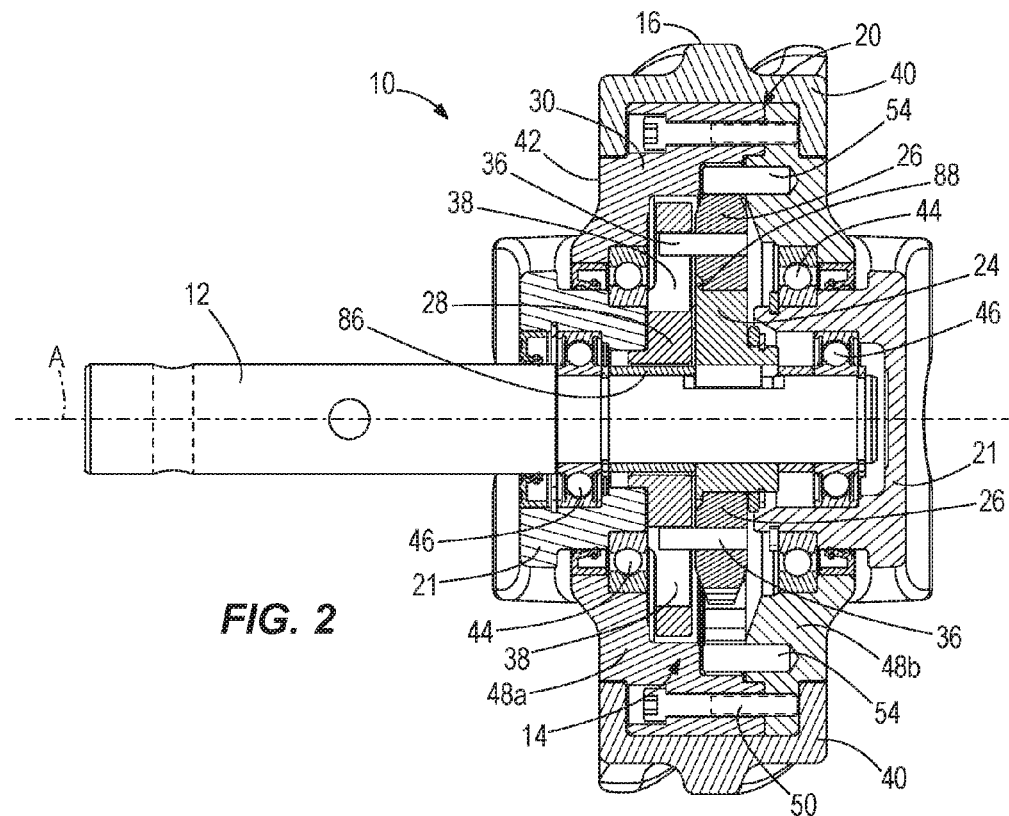
FIG. 2 is a cross section of the wheel assembly shown in FIGS. 1A-1D.
Figure 3:
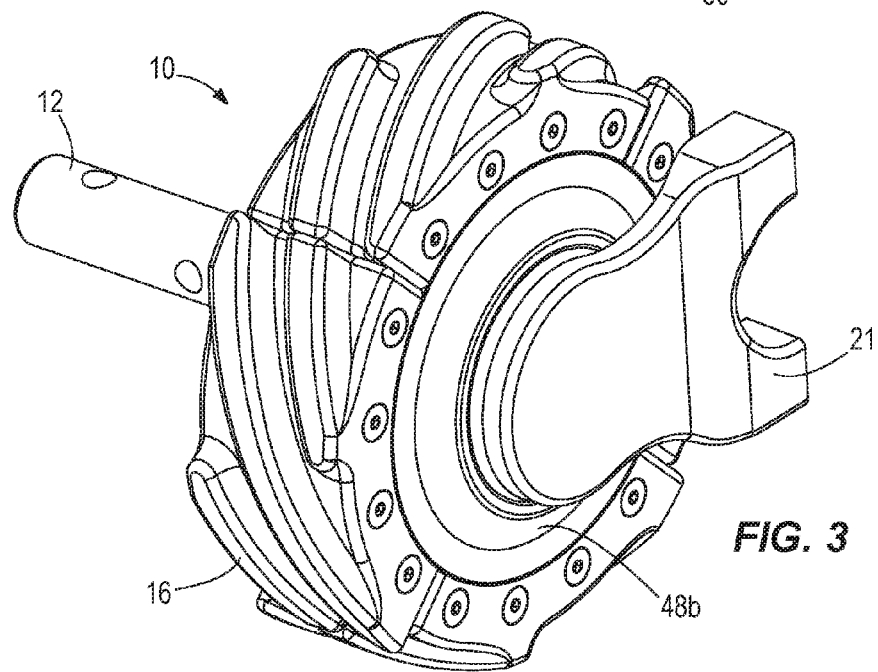
FIG. 3 is a perspective view of the wheel assembly shown in FIGS. 1A-1D.
Figure 4:
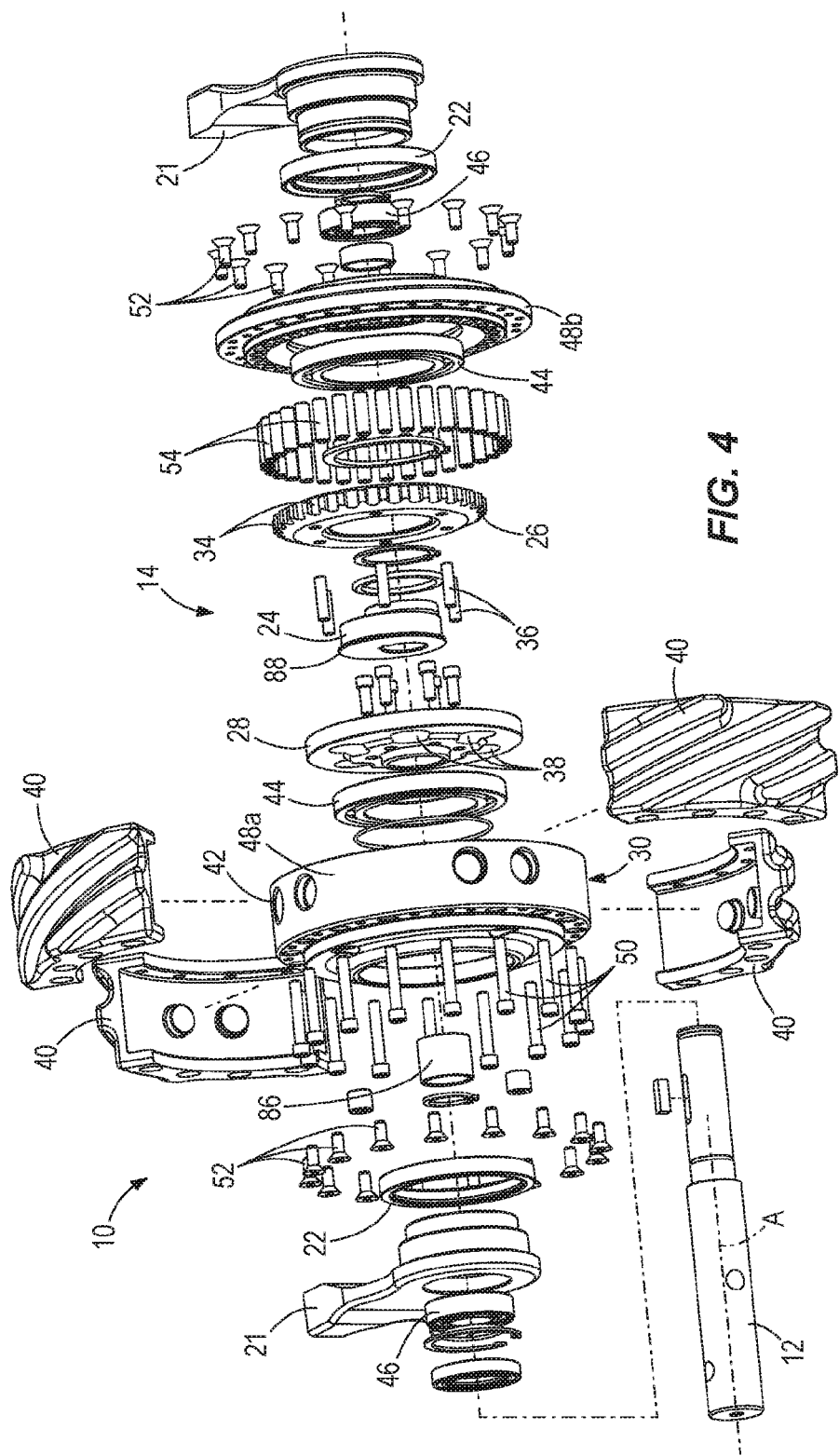
FIG. 4 is an exploded view of the wheel assembly shown in FIGS. 1A-1D.
Figure 5:
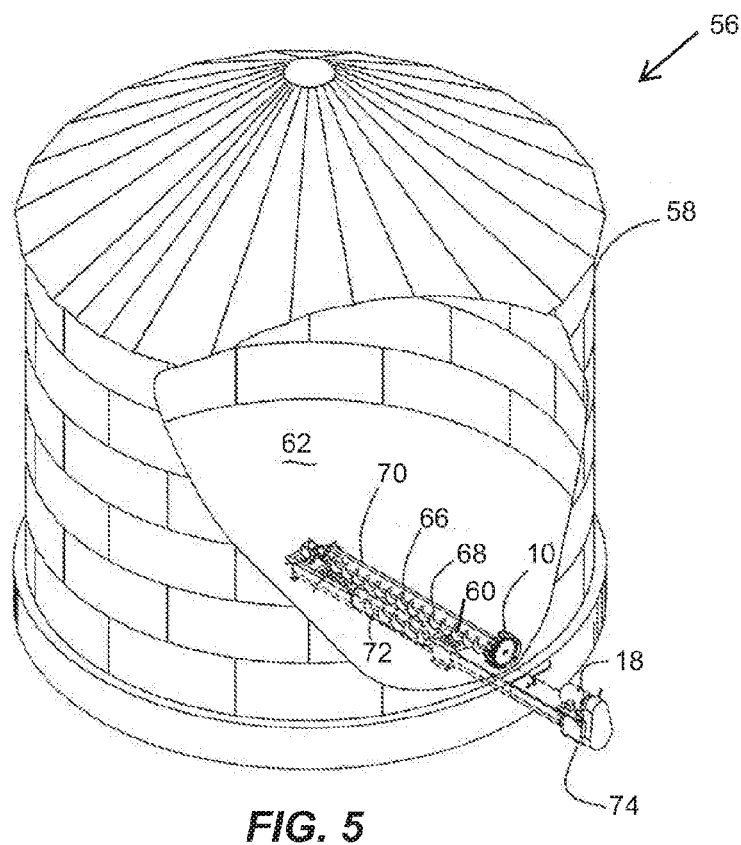
FIG. 5 illustrates the wheel assembly of FIGS. 1A-4 mounted in a granule conveyor.
Figure 6:
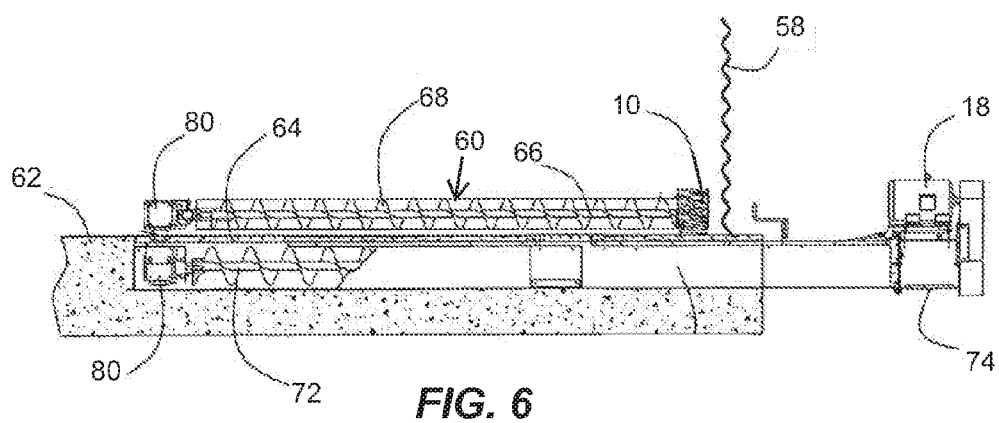
FIG. 6 is a partial sectional side view of the granule conveyor of FIG. 5.

As illustrated in FIGS. 1-4, a wheel assembly 10 includes an input shaft 12, a cycloidal drive 14, and a wheel 16 driven by the cycloidal drive 14. A motor 18 (see FIG. 5) drives the cycloidal drive 14. The wheel 16 is substantially toroidal and defines a cavity 20 within the toroidal shape. The cycloidal drive 14 is disposed in the cavity 20. Thus, the gear reduction is fully enclosed within the wheel 16. The cycloidal drive 14 is sealed within the wheel assembly 10 by end caps 21 and seals 22, and a lubrication system is contained within the sealed wheel assembly 10 for lubricating the cycloidal drive 14. For example, a lubricant such as oil is used and is sealed within the wheel assembly 10.

The cycloidal drive 14 includes the input shaft 12, an eccentric bearing 24, a drive gear 26, a stationary drive plate 28, and a movable ring gear 30. The input shaft 12 is driven by the motor 18 for rotation about an axis A. The eccentric bearing 24 is coupled to the input shaft 12 and includes a center C offset from the axis A for effectuating orbital motion as the input shaft 12 rotates about axis A. The drive gear 26 is coupled to the eccentric bearing 24 such that a center of the drive gear 26 is offset from the axis A and concentric with the eccentric bearing 24, i.e., coincides with the center C. As such, the eccentric bearing 24 imparts orbital motion to the drive gear 26. The eccentric bearing 24 may include balls, such as steel balls, a bushing, etc., to allow for relative rotation between the eccentric bearing 24 and the drive gear 26. The eccentric bearing 24 includes a shoulder 88 for locating the drive gear 26 with respect to the eccentric bearing 24 in the assembly.

The drive gear 26 includes an outer circumference having gearing features 34, such as teeth. In the illustrated construction, the drive gear 26 includes 30 teeth. In other constructions, the drive gear 26 may include other types of gearing features 34, such as pins, and include fewer or more gearing features in order to achieve a different ratio, as will be explained in greater detail below. The drive gear 26 also includes drive pins 36 extending axially (i.e., parallel to the axis A) therefrom, the drive pins 36 being fixedly coupled to the drive gear 26. In the illustrated construction, the drive gear 26 includes 6 drive pins 36. In other constructions, the drive gear 26 may include fewer or more drive pins 36, e.g., 4 drive pins, 5 drive pins, 7 drive pins, etc. The drive gear 26 generally defines a plane B having a first side and a second side. The drive pins 36 are disposed on a first side of the plane B.

The drive plate 28 is also disposed on the first side of the plane B. The drive plate 28 is coupled to the drive shaft 12 by way of a bearing 86 such that the drive plate 28 is fixed to be stationary as the drive shaft 12 rotates. The drive plate 28 includes drive holes 38 for receiving the drive pins 36. The drive holes 38 have a diameter greater than the diameter of the drive pins 36 such that the drive pins 36 may orbit within the drive holes 38. As such, the drive gear 26 is constrained to orbital motion about axis A. In the illustrated construction, the drive plate 28 includes 6 drive holes corresponding with the 6 drive pins. Similarly, in other constructions, the drive plate 28 may include fewer or more drive holes 38, e.g., 4 drive holes, 5 drive holes, 7 drive holes, etc., preferably corresponding with the number of drive pins 36.

The wheel 16 includes a tire 40 and the ring gear 30 having a substantially cylindrical housing 42 mounted for rotation with respect to the axis A by bearings 44 and bearings 46. The housing 42 includes first and second portions 48a, 48b coupled together to form the substantially cylindrical housing 42. The first and second portions 48a, 48b are coupled by fasteners 50, such as screws. In other constructions, the first and second portions 48a, 48b may be coupled by other fasteners or formed as more than two pieces coupled together or formed as a single piece. The substantially cylindrical housing 42 substantially encloses the cycloidal drive 14 within the wheel 16. The substantially cylindrical housing 42 has an outer circumference. The tire 40 is disposed on or outside of the outer circumference and is fastened to the substantially cylindrical housing 42 by fasteners 52, e.g., screws. The substantially cylindrical housing 42 includes gearing features 54, such as ring pins, disposed adjacent or defining an inner circumference of the substantially cylindrical housing 42. As such, the substantially cylindrical housing 42 acts as both a rim for the tire 40 and a ring gear 30 in the cycloidal drive 14. The ring pins 54 extend substantially parallel to the axis A and are coupled to sides of the substantially cylindrical housing 42. In the illustrated construction, 34 ring pins are employed in the ring gear 30 for meshing with and being driven by the 30 teeth of the drive gear 26. As such, the wheel 16 is driven directly by the drive gear 26. In other constructions, the ring gear 30 and the drive gear 26 may have other gearing features, e.g., teeth, pins, etc.

The wheel 16, including the ring gear 30, is driven by the cycloidal drive 14 and rotates in the same direction as the drive shaft 12, e.g., both clockwise or both counterclockwise. The cycloidal drive 14 reduces output speed and increases output torque while preserving direction of rotation. Other ratios can be achieved by changing the number of gearing features 34 on the drive gear and number of gearing features 54 in the ring gear, etc.

The wheel assembly 10 may be employed in a granule conveyor 56, such as a bin sweep system. The wheel assembly 10 may also be employed in other wheel-driven applications. In the illustrated construction, the wheel assembly 10 is employed in a bin sweep system 56 for granules, such as grains. The bin sweep system 56 is disposed in a storage container 58, such as a silo, bin, granary, etc., for emptying the storage container 58 of its contents, such as granules or grains.

The bin sweep system 56 includes a sweep auger 60 for conveying the granules towards a center of the storage container 58. The sweep auger 60 is disposed substantially along a radius of a floor 62 of the storage container 58, the storage container 58 being substantially cylindrical and the floor 62 being substantially circular. A discharge opening 64 is located proximate the center of the floor 62 of the storage container 68 for discharging the granules or grains from the storage container 68. The sweep auger 60 includes a shaft 66, a flighting 68, and a back plate 70 which acts as a channel to move the granules radially inward toward the discharge opening 64. The bin sweep system 56 may also include an unload auger 72 for directing the granules downstream of the discharge opening 64 and outside of the storage container 58. The unload auger 72 moves granules radially outwards from the center of the storage bin 58 parallel to the axis A to an external granule discharge 74.

Figure 7A:
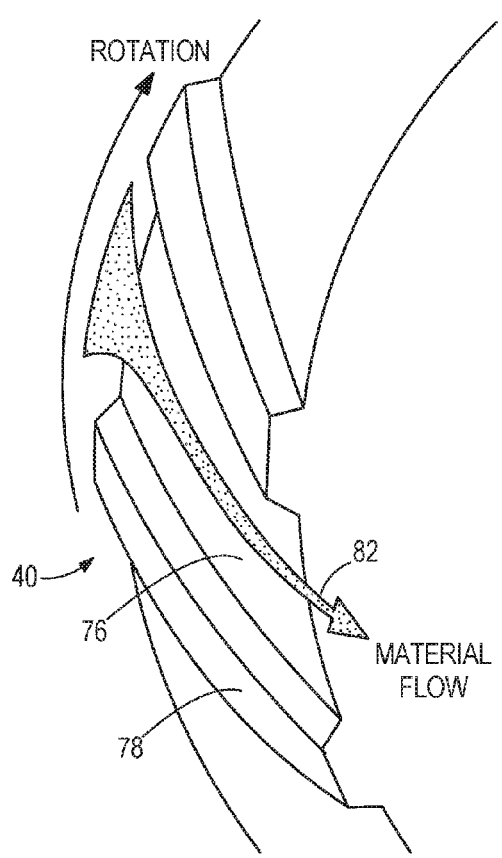
FIG. 7A is a partial enlarged view of the wheel assembly of FIGS. 1A-4 illustrating material flow.
Figure 7B:
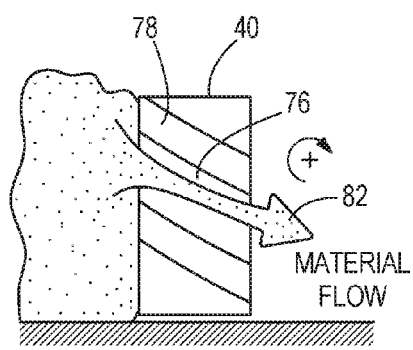
FIG. 7B is a schematic view of the wheel assembly of FIGS. 1A-4 illustrating material flow.
Figures 8A, 8B, 8C:
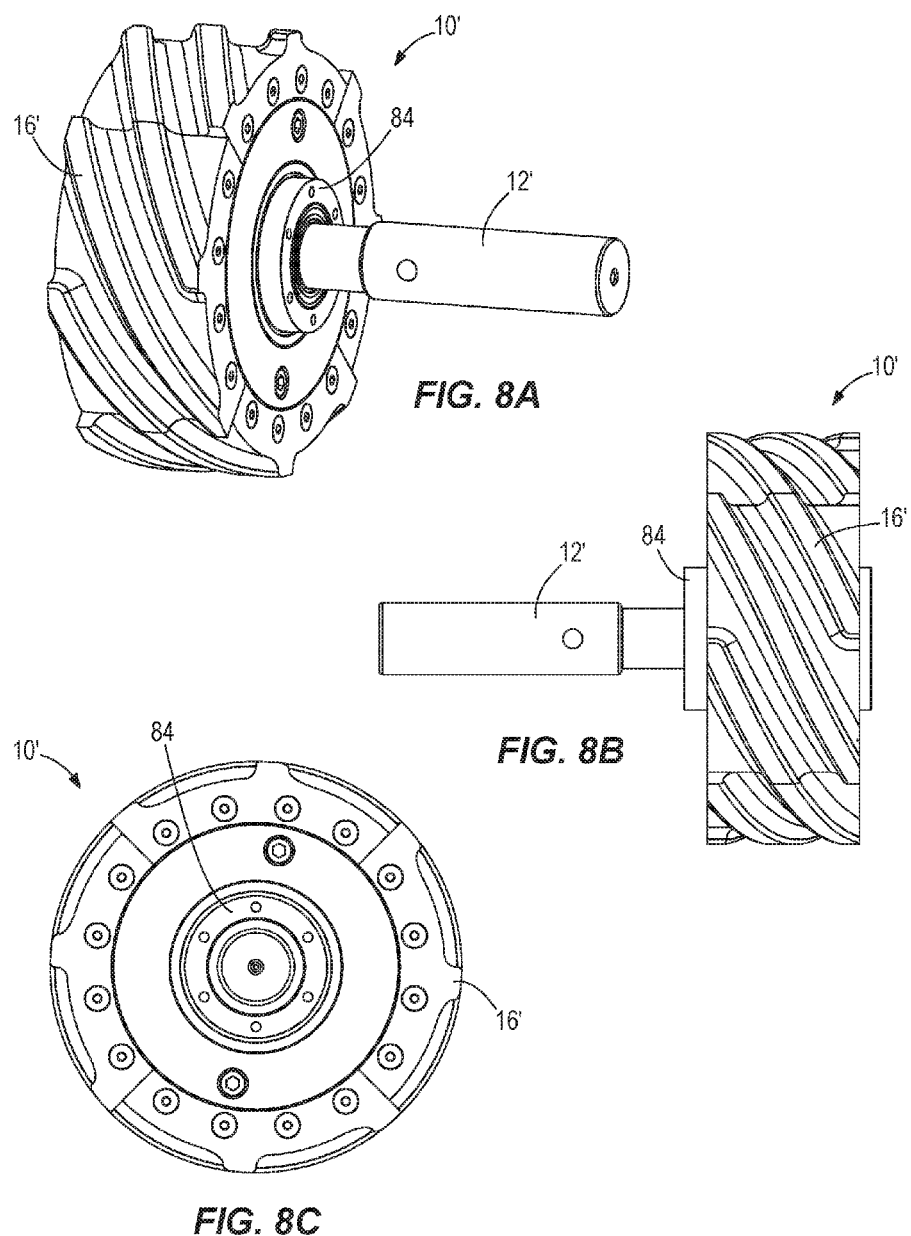
FIGS. 8A-8D, 9, and 10 illustrate a second construction of the wheel assembly.
Figure 8D:
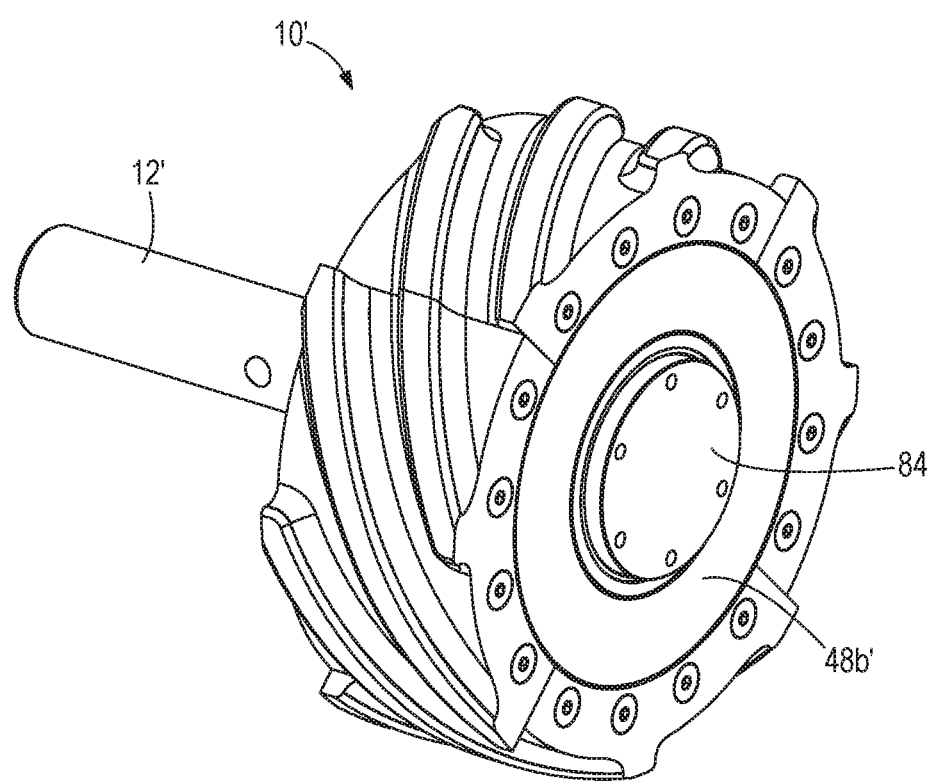
Figure 9:
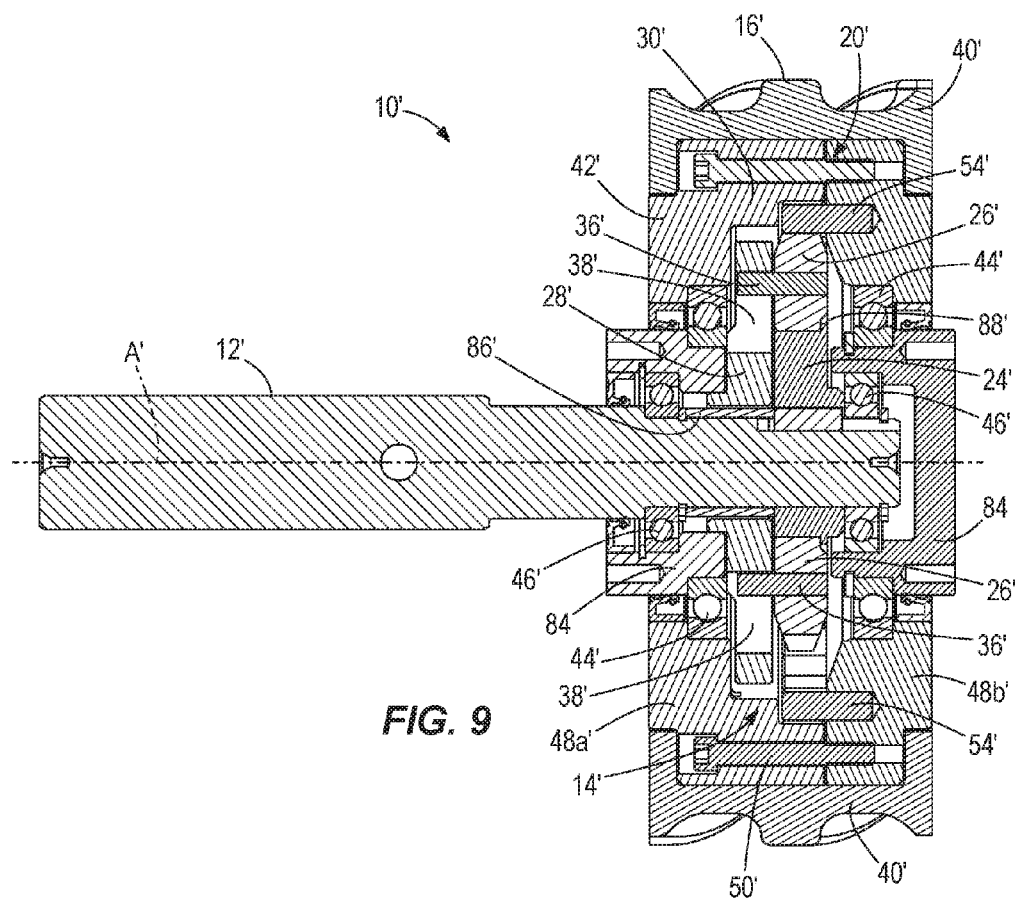
Figure 10:
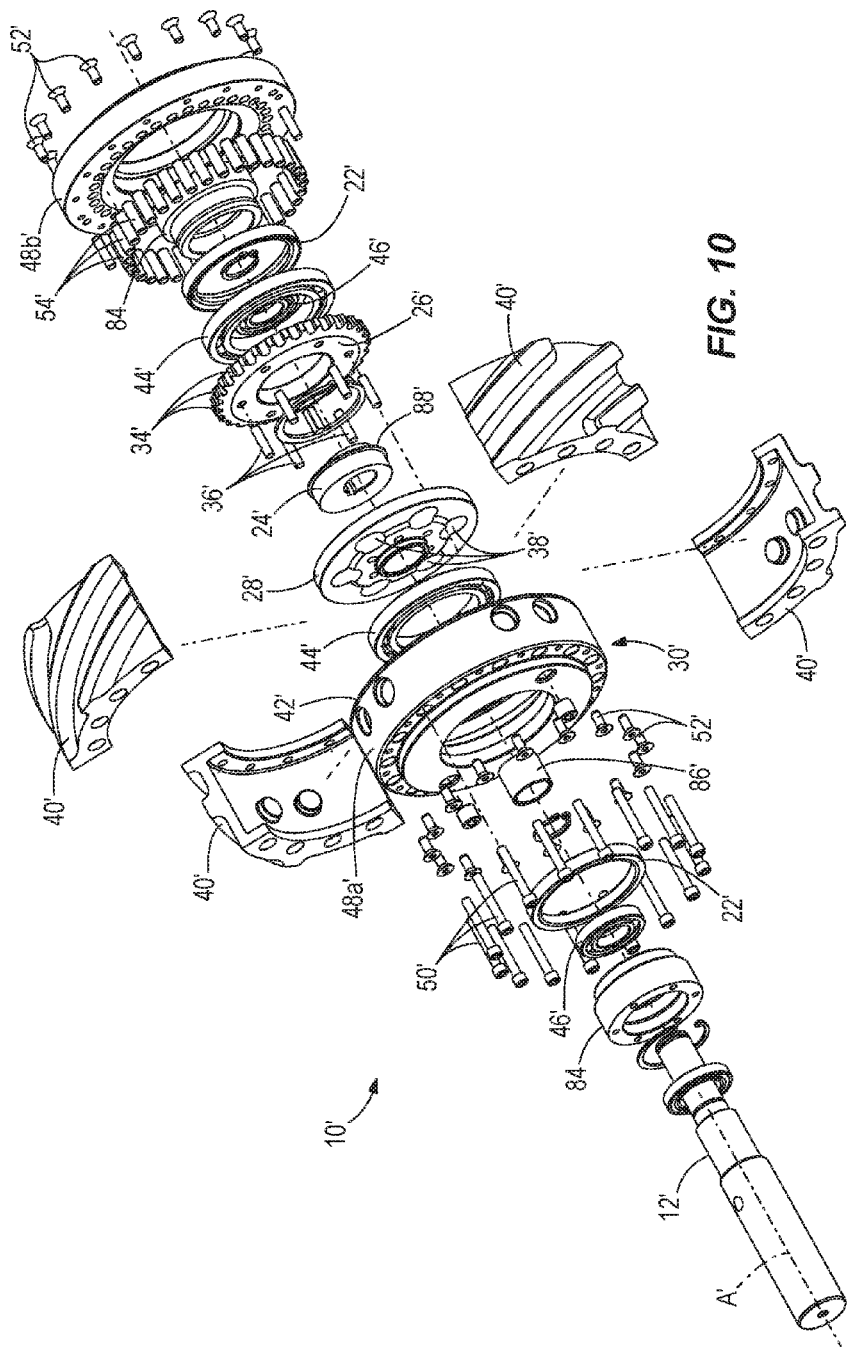

The tire 40 supports the wheel assembly 10 and sweep auger 60 within the storage container 68 on the floor 62 and also conveys granules radially inwards towards the discharge opening 64. As illustrated in FIGS. 7A-7B, the tire 40 includes grooves 76 and treads 78 in an alternating fashion and disposed at an angle with respect to the axis A and with respect to the floor 62 of the storage container 68 on which the tire 40 rests. The grooves 76 and treads 78 are disposed about the outer circumference of the tire 40. The grooves 76 channel material 82, such as granules or grains, from one side of the wheel assembly 10 to another side of the wheel assembly 10 in substantially the axial direction of axis A and radially inwards towards the sweep auger 60 and, ultimately, towards the discharge opening 64.

The wheel assembly 10 is coupled to the sweep auger 60 and disposed proximate an outer distal end of the sweep auger 60 for supporting the sweep auger 60 and driving the sweep auger 60 around the floor 62 storage container 58. The sweep auger 60 and the wheel assembly 10 are disposed inside the storage container 58. In the illustrated construction, the motor 18 drives the unload auger 72 for rotation, which is drivingly coupled to the sweep auger 60 through drive boxes 80 to drive the sweep auger 60 for rotation, which is drivingly coupled to the input shaft 12 of the wheel assembly 10. The input shaft 12 and the sweep auger 60 are both coupled concentrically with the wheel assembly 10, e.g., coaxially with the axis A of rotation of the wheel assembly 10. The wheel assembly 10 moves the sweep auger 60 around the storage container 58, as described above. In other constructions, various combinations of separate motors may be employed to drive the unload auger 72, the sweep auger 60, and the wheel assembly 10. For example, a separate motor may be dedicated to each of the unload auger 72, the sweep auger 60, and the wheel assembly 10. In yet other constructions, various combinations of one or more motors may be employed to drive the unload auger 72, the sweep auger 60, and the wheel assembly 10 in various combinations and configurations. In the illustrated construction, the motor 18 is disposed outside of the storage bin 58 proximate the external granule discharge 74. In other constructions, the motor 18 (or some or all of the motors) may be disposed inside the storage container 58.

Other features of the bin sweep system 56 are illustrated and described in U.S. Pat. No. 8,210,342, the entire contents of which are incorporated herein by reference.

In operation, the motor 18 drives the wheel assembly 10 and sweep auger 60 to move the granules towards the discharge opening 64 proximate the center of the storage container 58. The motor 18 also drives the unload auger 72 to move the granules towards the external granule discharge 74 outside of the storage container 58. The motor 18 also drives the wheel assembly 10 to move slowly about a circumference of the storage container 58 to move the sweep auger 60 slowly around the discharge opening as the sweep auger 60 rotates about its own axis (axis A). The cycloidal drive 14 disposed in the wheel assembly 10 reduces the speed of the input shaft 12 such that the wheel 16 is driven at a lower speed than the input shaft 12. Specifically, the input shaft 12 drives the drive gear 26 eccentrically by way of the eccentric bearing 24 mounted on the input shaft 12 and offset from the axis A of the input shaft 12. The drive gear 26 is constrained to an orbital path by the drive pins 36 extending therefrom, which are constrained to move within drive holes 38 in the stationary drive plate 28. The drive gear 26 orbits within an inner circumference of the ring pins 54. The teeth 34 of the drive gear 26 engage and transmit force to the ring pins 54 as there are fewer teeth 34 on the drive gear 26 than there are ring pins 54, causing the ring gear 30 to rotate slowly relative to the input shaft 12. Thus the wheel 16, which includes the ring gear 30, is driven slowly relative to the input shaft 12 and in the same direction as the input shaft 12 to move the sweep auger 60 around the storage container 58.

FIGS. 8A-8D, 9, and 10 illustrate an alternate construction of a wheel assembly 10'. Except for the below-described features, the wheel assembly 10' is substantially the same as the wheel assembly 10 described above and shown in FIGS. 1A-7B. Elements of the wheel assembly 10' that are substantially the same as the construction of the wheel assembly 10 have the same reference number prime ("'") and are not described again in detail.

As illustrated in FIGS. 8A-8D, 9, and 10, in the wheel assembly 10', the end caps 21 having mounting arms are replaced with a hub 84 which may allow more universal mounting. The shoulder 88 has been moved from one axial end of the eccentric bearing 24 to the opposite axial end (see shoulder 88' of the eccentric bearing 24' in FIG. 10). The wheel assembly 10' may be employed in the granule conveyor 56 in the same manner as described above with respect to the wheel assembly 10.

Figure 11:
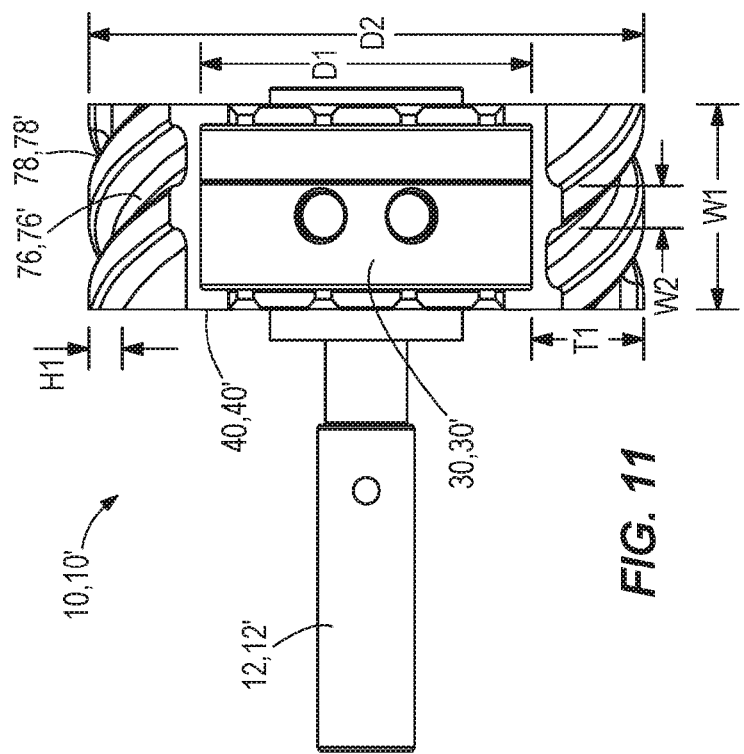
FIG. 11 is a side cutout view of a tire on the wheel assembly having a diameter of 8".

FIG. 11 illustrates the tire 40, 40' disposed about the ring gear 30, 30' of the wheel assembly 10, 10'. In the illustrated construction, the wheel assembly 10, 10' has a diameter D1 of about 4.7 inches (about 12 cm), and the tire 40, 40' has a diameter D2 of about 8 inches (about 20 cm). In other constructions, the wheel assembly 10, 10' may have a diameter D1 of about 4 inches to about 5 inches (about 10 cm to about 13 cm), about 3 inches to about 6 inches (about 7 cm to about 15 cm), less than 3 inches (less than about 7 cm), more than 6 inches (more than about 15 cm), etc., and the tire 40, 40' may have a diameter D2 of about 7 inches to about 9 inches (about 18 cm to about 23 cm), about 6 inches to about 10 inches (about 15 cm to about 25 cm), less than 6 inches (less than about 15 cm), more than 10 inches (more than about 25 cm), etc. In some constructions, the wheel assembly 10, 10' and tire 40, 40' may have diameters D1, D2 on the order of feet (meters). In the illustrated construction, the thickness T1 of the tire 40, 40' is about 1.6 inches (about 4 cm); however, in other constructions, the thickness T1 may be between about 1 inch to about 2 inches (about 2 cm to about 5 cm), less than about 1 inch (less than about 2 cm), or more than about 2 inches (more than about 5 cm). In the illustrated construction, the width W1 of the wheel assembly 10, 10' and the tire 40, 40' is about 3 inches (about 8 cm). Preferably, the width W1 is substantially the same for both the wheel assembly 10, 10' and the tire 40, 40' so the tire 40, 40' fits evenly over the wheel assembly 10, 10' and the wheel assembly 10, 10' may be contained substantially within a receptacle defined by the tire 40, 40'.

The tire 40, 40' includes the grooves 76, 76' and treads 78, 78' having a height H1 of about 0.5 inches (about 1 cm) and a width W2 of about 0.5 inches (about 1 cm). In other constructions, the height H1 may be larger or smaller, e.g., between about 0.25 and about 0.75 inches (between about 0.5 cm and about 2 cm), and the width W2 may be larger or smaller, e.g., between about 0.25 and about 0.75 inches (between about 0.5 cm and about 2 cm).

Figure 12:
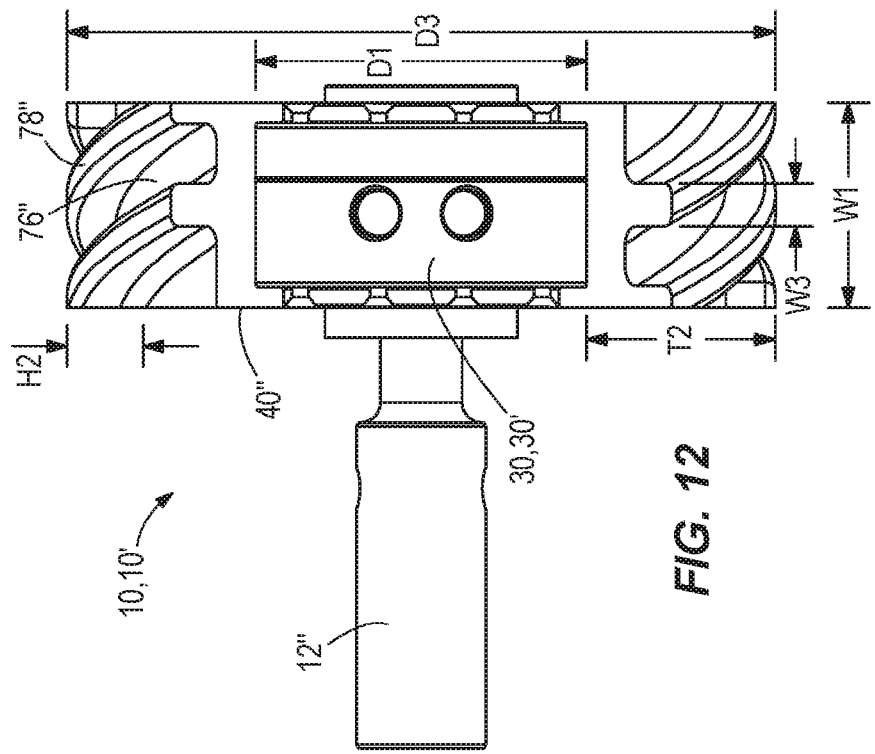
FIG. 12 is a side cutout view of a tire on the wheel assembly having a diameter of 10".

FIG. 12 illustrates another construction of the tire 40" disposed about the ring gear 30, 30' of the wheel assembly 10, 10'. The tire 40" has a diameter D1 of about 10 inches (about 25 cm) and substantially the same width W1 as the tire 40, 40', as described above, for fitting evenly over the wheel assembly 10, 10' and receiving the wheel assembly 10, 10' substantially within a receptacle defined by the tire 40". The tire 40" has a thickness T2 of about 2.6 inches (about 6.6 cm). The grooves 76" and treads 78" have a height H2 of about 1 inch (about 3 cm) and a width W3 of about 0.5 inches (about 1 cm). The input shaft 12" may be more robust in this construction. In other constructions, the grooves 76" and treads 78" may have other heights and widths suitable for other applications. In other constructions, the tire 40" may have other sizes, shapes, treads, grooves, and configurations suitable for other applications.

Thus, the invention may provide, among other things, a wheel assembly including a gear reduction system having a compact design and reduced width capable of achieving a wide range of ratios.

One or more independent features and/or independent advantages of the invention may be set forth in the following claims:

What is claimed is:
1. A bin sweep system comprising:
   a sweep auger for moving granules; and a wheel assembly including
an input shaft driven by the sweep auger,
a wheel defining an axis of rotation, and
a cycloidal drive driven by the input shaft to drive the wheel at a reduced speed, the cycloidal drive including
an eccentric bearing coupled to the input shaft,
a drive gear coupled to the eccentric bearing and concentric with the eccentric bearing,
a stationary drive plate coupled to the input shaft such that the stationary drive plate does not rotate with the input shaft,
a movable ring gear coupled to the drive gear for relative rotation, the movable ring gear including a cylindrical housing having at least one axially-facing side facing axially with respect to the axis of rotation of the wheel, and
pins fixed with respect to, and extending axially away from, the at least one axially-facing side of the cylindrical housing.

2. The system of claim 1, wherein the sweep auger, the input shaft, and the wheel are substantially coaxial.

3. The system of claim 1, wherein the wheel defines a cavity and the cycloidal drive is disposed within the cavity.

4. The system of claim 3, wherein the wheel assembly further comprises end caps coupled to the wheel and sealing the cavity.

5. The system of claim 3, wherein the wheel includes a tire and the tire at least partially defines the cavity.

6. The system of claim 5, wherein the tire comprises multiple curved segments coupled to the wheel assembly with fasteners.

7. The system of claim 1, wherein the cylindrical housing of the movable ring gear is mounted for rotation about the input shaft, the cylindrical housing enclosing the eccentric bearing, the drive gear and stationary drive plate.

8. The system of claim 7, further comprising a tire coupled to the cylindrical housing.

9. The system of claim 8, wherein the tire includes treads defining angled channels for directing granular material therethrough and towards the sweep auger, and wherein the tire includes multiple arc-shaped segments, each segment being independently coupled to the wheel assembly.

10. The bin sweep system of claim 1, wherein the stationary drive plate defines an aperture, and wherein a pin is fixed with respect to, and extends axially from, the drive gear, the pin being received in the aperture of the stationary drive plate for movement within the aperture.

11. A wheel assembly for use in a bin sweep system having a sweep auger, the wheel assembly comprising:
an input shaft adapted for driven engagement with the sweep auger,
a wheel, and
a cycloidal drive driven by the input shaft to drive the wheel at a reduced speed, the cycloidal drive including
an eccentric bearing adapted to be coupled to the input shaft,
a movable drive gear coupled to the eccentric bearing and concentric with the eccentric bearing,
a stationary drive plate configured to be-coupled to the input shaft such that the stationary drive plate does not rotate with the input shaft, the stationary drive plate defining an aperture,
a movable ring gear coupled to the drive gear for relative rotation,
ring pins fixedly coupled to the ring gear, and
a drive pin fixed with respect to, and extending axially from, the movable drive gear, the drive pin being received in the aperture of the stationary drive plate for movement within the aperture.

12. The wheel assembly of claim 11, wherein the wheel defines a cavity and the cycloidal drive is disposed within the cavity.

13. The wheel assembly of claim 12, wherein the wheel assembly further comprises end caps coupled to the wheel and sealing the cavity.

14. The wheel assembly of claim 12, wherein the wheel includes a tire and the tire at least partially defines the cavity.

15. The wheel assembly of claim 14, wherein the tire comprises multiple curved segments coupled to the wheel assembly with fasteners.

16. The wheel assembly of claim 11, wherein the movable ring gear further comprises a cylindrical housing adapted for rotation about the input shaft, the cylindrical housing enclosing the eccentric bearing, the drive gear and stationary drive plate.

17. The wheel assembly of claim 16, further comprising a tire coupled to the cylindrical housing.

18. The wheel assembly of claim 17, wherein the tire comprises multiple arc-shaped segments coupled to the wheel assembly with fasteners.

19. The wheel assembly of claim 18, wherein the tire includes treads defining angled channels for directing granular material therethrough and towards the sweep auger.

20. The wheel assembly of claim 11, wherein the movable ring gear includes a cylindrical housing having at least one axially-facing side, and wherein the ring pins extend axially away from the at least one axially-facing side of the cylindrical housing.

* * * * *